US009460352B2

United States Patent
Tsuruta et al.

(10) Patent No.: US 9,460,352 B2
(45) Date of Patent: Oct. 4, 2016

(54) LANE BOUNDARY LINE RECOGNITION DEVICE

(71) Applicant: DENSO CORPORATION, Kariya, Aichi-pref. (JP)

(72) Inventors: Tomohiko Tsuruta, Aichi-ken (JP); Shunsuke Suzuki, Aichi-ken (JP); Naoki Kawasaki, Kariya (JP); Osamu Shimomura, Okazaki (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 14/792,858

(22) Filed: Jul. 7, 2015

(65) Prior Publication Data

US 2016/0012300 A1    Jan. 14, 2016

(30) Foreign Application Priority Data

Jul. 11, 2014   (JP) .................... 2014-143319

(51) Int. Cl.
G06K 9/00  (2006.01)
G06K 9/52  (2006.01)
G06T 7/60  (2006.01)
G06K 9/62  (2006.01)
G06T 7/00  (2006.01)
G06K 9/46  (2006.01)

(52) U.S. Cl.
CPC ............. *G06K 9/00798* (2013.01); *G06K 9/52* (2013.01); *G06K 9/6215* (2013.01); *G06T 7/0042* (2013.01); *G06T 7/60* (2013.01); *G06K 2009/4666* (2013.01); *G06T 2207/30256* (2013.01)

(58) Field of Classification Search
CPC ................. G06K 2009/4666; G06K 9/00798; G06K 9/52; G06K 9/6215; G06T 2207/30256; G06T 7/0042; G06T 7/60
See application file for complete search history.

(56) References Cited

U.S. PATENT DOCUMENTS

| 8,682,033 B2 * | 3/2014 | Nakano | G06K 9/00798 382/103 |
| 2006/0210116 A1 * | 9/2006 | Azuma | G06K 9/00798 382/104 |
| 2008/0219505 A1 * | 9/2008 | Morimitsu | G06K 9/00201 382/103 |
| 2008/0273750 A1 * | 11/2008 | Fujimoto | G06K 9/00362 382/103 |
| 2010/0259617 A1 * | 10/2010 | Kawasaki | G06K 9/6292 348/148 |
| 2012/0099766 A1 * | 4/2012 | Klein | G06K 9/00798 382/104 |

FOREIGN PATENT DOCUMENTS

JP    H10300494    11/1998

* cited by examiner

*Primary Examiner* — Tom Y Lu

(74) *Attorney, Agent, or Firm* — Knobbe, Martens, Olson & Bear, LLP

(57) ABSTRACT

In a lane boundary line recognition device, an extraction unit extracts lane boundary line candidates from image acquired by an in-vehicle camera. A position estimation unit estimates a position of each lane boundary line based on drive lane information containing a number of drive lanes on a roadway and a width of each drive lane when (a) and (b) are satisfied, (a) when an own vehicle drives on an own vehicle lane specified by the drive lane specifying unit, and (b) when the lane boundary line candidate corresponds to lane boundary lines of the own vehicle lane. A likelihood calculation unit increases a likelihood of the lane boundary line candidate when a distance between a position of the lane boundary line candidate and an estimated position of the lane boundary line candidate obtained by the drive lane boundary line position estimation unit is within a predetermined range.

8 Claims, 8 Drawing Sheets

LANE BOUNDARY LINE RECOGNITION DEVICE

CROSS-REFERENCE TO RELATED APPLICATION

This application is related to and claims priority from Japanese Patent Application No. 2014-143319 filed on Jul. 11, 2014, the contents of which are hereby incorporated by reference.

BACKGROUND OF THE INVENTION

1. Field of the Invention

The present invention relates to lane boundary line recognition devices capable of recognizing lane boundary lines of an own vehicle on a roadway on which an own vehicle drives.

2. Description of the Related Art

There are lane boundary line recognition devices capable of acquiring images in front of an own vehicle on an own vehicle lane of a roadway by using an in-vehicle camera mounted on the own vehicle. The lane boundary line recognition devices are mounted on the own vehicle. The lane boundary line recognition devices recognize lane boundary lines, for example, solid white lines, dotted white lines, etc., on the roadway from the acquired images. In general, the lane boundary line recognition device extracts edges from the acquired images on the basis of a brightness change in the acquired images. The lane boundary line recognition device calculates a fitted curve which is fitted to the extracted edges as a lane boundary line of the own vehicle lane.

For example, a patent document 1, Japanese laid open publication No. H10-300494, firstly determines a lane boundary line at a near side of the own vehicle on the own vehicle lane on which the own vehicle drives. Secondly, the lane boundary line recognition device recognizes the other lane boundary line arranged at a far side of the own vehicle on the own vehicle lane on the basis of the already-recognized lane boundary line at the near side of the own vehicle.

SUMMARY

It is therefore desired to provide a lane boundary line recognition device capable of correctly recognizing various types of lane boundary lines on a roadway on which an own vehicle drives.

An exemplary embodiment provides a lane boundary line recognition device having an image acquiring unit, a drive lane boundary line candidate extraction unit, a likelihood calculation unit, a drive lane boundary line recognition unit, a selection unit, a drive lane information acquiring unit, a drive lane specifying unit and a drive lane boundary line position estimation unit. The image acquiring unit acquires surrounding images of a roadway on which an own vehicle drives. The drive lane boundary line candidate extraction unit extracts lane boundary line candidates from the images acquired by the image acquiring unit. The likelihood calculation unit calculates a likelihood of each of the lane boundary line candidates. The drive lane boundary line recognition unit recognizes, as a lane boundary line, the lane boundary line candidate having the likelihood of not less than a predetermined threshold value. The selection unit selects a predetermined number of the lane boundary line candidates having the likelihood of not less than the predetermined threshold value. The drive lane information acquiring unit obtains drive lane information containing a number of drive lanes on the roadway on which the own vehicle drives, and a width of each of the drive lanes. The drive lane specifying unit correlates the image with the drive lane information, and specifies an own vehicle lane on which the own vehicle drives in the drive lanes indicated by the drive lane information. The drive lane boundary line position estimation unit estimates a position of each of the lane boundary lines on the basis of the drive lane information when two conditions (a) and (b) are satisfied, (a) when the own vehicle drives on the drive lane which is specified as the own vehicle lane by the drive lane specifying unit, and (b) when the lane boundary line candidates selected by the selection unit correspond to lane boundary lines of the drive lane specified by (a). The likelihood calculation unit increases the likelihood of the lane boundary line candidate when a distance between a position of the lane boundary line candidate obtained from the images and the estimated position of the lane boundary line candidate obtained by the drive lane boundary line position estimation unit is within a predetermined range.

The likelihood calculation unit in the lane boundary line recognition device according to the exemplary embodiment increases the likelihood of the lane boundary line candidate when the distance between the position of this lane boundary line candidate and the estimated position obtained by the lane boundary line position estimation unit is within a predetermined range, as compared with another lane boundary line candidate when a distance between the position of this lane boundary line candidate and the estimated position of the lane boundary line position estimation unit is out of the predetermined range.

Further, the lane boundary line recognition device according to the present invention can recognize lane boundary lines on another drive lane with high accuracy in addition to the lane boundary line on the own vehicle lane on which the own vehicle drives.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
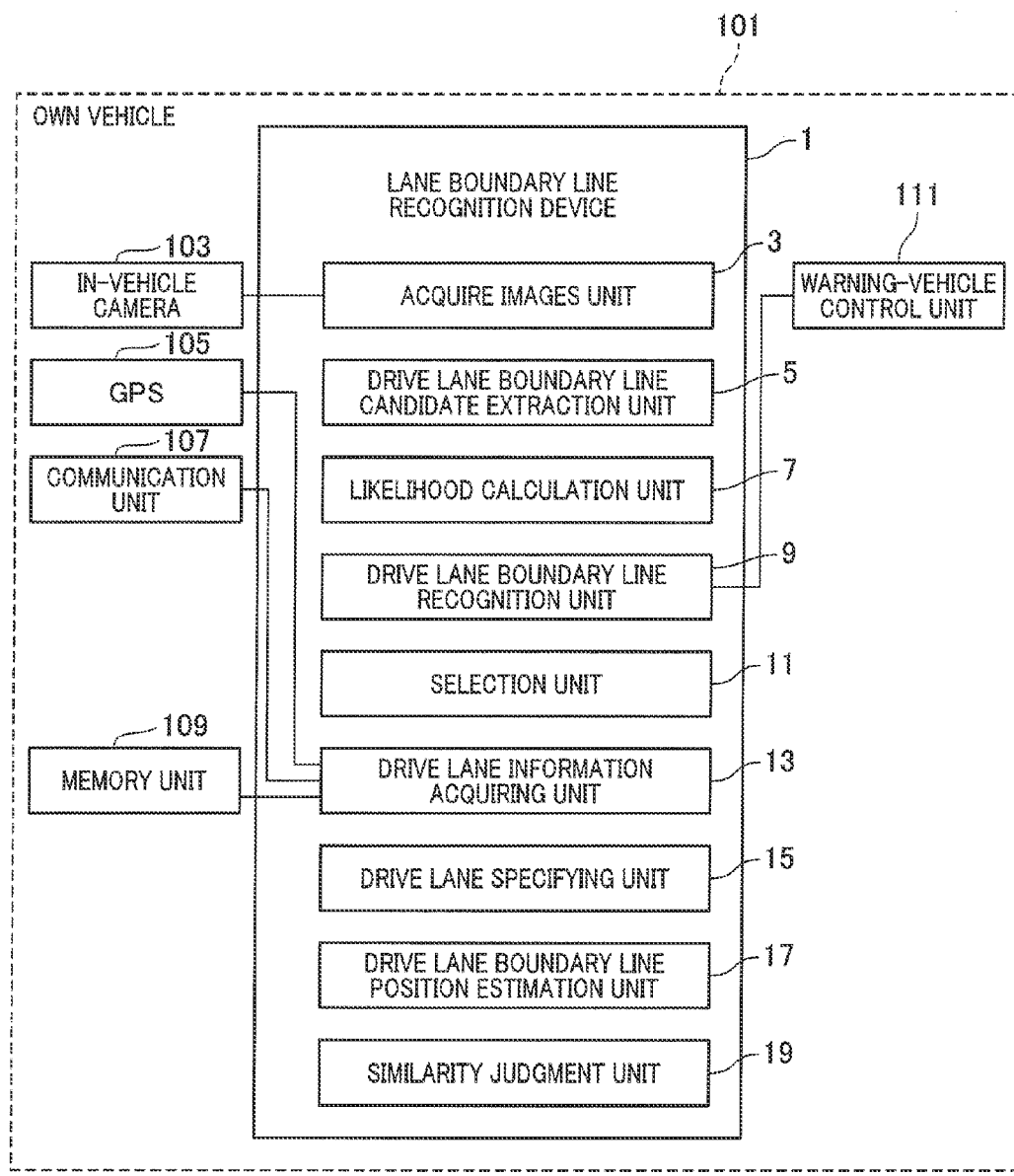
FIG. 1 is a view showing a block diagram of a structure of a lane boundary line recognition device 1 according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of the lane boundary line recognition device 1 according to a first exemplary embodiment with reference to FIG. 1 to FIG. 6A and FIG. 6B.

FIG. 1 is a view showing a block diagram of a structure of the lane boundary line recognition device 1 according to the first exemplary embodiment.

1. Structure of the Lane Boundary Line Recognition Device 1

The lane boundary line recognition device 1 according to the first exemplary embodiment can be applied to motor vehicles, etc. For example, an own vehicle 101 is equipped with the lane boundary line recognition device 1.

For example, it is possible to realize the function of the lane boundary line recognition device 1 according to the first exemplary embodiment by using one or more programs stored in a computer-readable storage medium. A central processing unit in a computer system reads the program stored in the computer-readable storage medium and performs the program to execute the functions of the lane boundary line recognition device 1. Such a computer system will be explained later.

The lane boundary line recognition device 1 has a plurality of functions or processes. These functions correspond to an image acquiring unit 3, a drive lane boundary line candidate extraction unit 5, a likelihood calculation unit 7, a drive lane boundary line recognition unit 9, a selection unit 11, a drive lane information acquiring unit 13, a drive lane specifying unit 15, a drive lane boundary line position estimation unit 17 and a similarity judgment unit 19, respectively.

As shown in FIG. 1, the own vehicle 101 is equipped with the lane boundary line recognition device 1, an in-vehicle camera 103, a global positioning system (GPS) 105, a communication unit 107, a memory unit 109, and a warning-vehicle control unit 111 in addition to the lane boundary line recognition device 1.

The in-vehicle camera 103 acquires images around, in particular, in front of the own vehicle 101. The own vehicle 101 drives on a roadway, i.e. on a drive lane (as an own vehicle lane) on the roadway. The in-vehicle camera 103 acquires images, and transmits the acquired images to the lane boundary line recognition device 1. The image contains at least a scene of the own vehicle lane in front of the own vehicle 101.

The in-vehicle camera 103 acquires a plurality of images around the own vehicle 101. One of the acquired images shows a front scene in front of the own vehicle 101.

The GPS 105 acquires position information of the own vehicle 101. The communication unit 107 communicates with other vehicles, road facilities and infrastructures. The memory unit 109 consists of known memory storage devices such as a hard disk drive (HDD), etc. The memory unit 109 stores data and information to be used by the lane boundary line recognition device 1 when performing the processes (or functions) of the lane boundary line recognition device 1.

The warning-vehicle control unit 111 performs a known warning process and a vehicle control process on the basis of lane boundary lines recognized by the lane boundary line recognition device 1. For example, in a possible case in which the own vehicle 101 will depart from the own vehicle lane when the own vehicle 101 approaches the lane boundary line, the warning-vehicle control unit 111 performs the warning process to warn of a dangerous risk of the own vehicle, and performs the vehicle control process such as automatic steering control to return the own vehicle to the inside of the own vehicle lane.

The warning-vehicle control unit 111 specifies the position of one or more other drive lanes (or adjacent drive lanes), which are adjacent to the own vehicle lane on which the own vehicle 101 drives, on the basis of the lane boundary lines recognized by the lane boundary line recognition device 1. The warning-vehicle control unit 111 further detects other vehicles and road obstacles on the adjacent drive lanes. When the own vehicle 101 changes to the adjacent drive lane from the own vehicle lane, and there are other vehicles and road obstacles on the adjacent drive lane, the warning-vehicle control unit 111 provides warning to the driver of the own vehicle 101.

2. Processes Performed by the Lane Boundary Line Recognition Device 1

A description will now be given of the processes (or functions) performed by the lane boundary line recognition device 1 with reference to FIG. 2 to FIG. 6.

Figure 2:
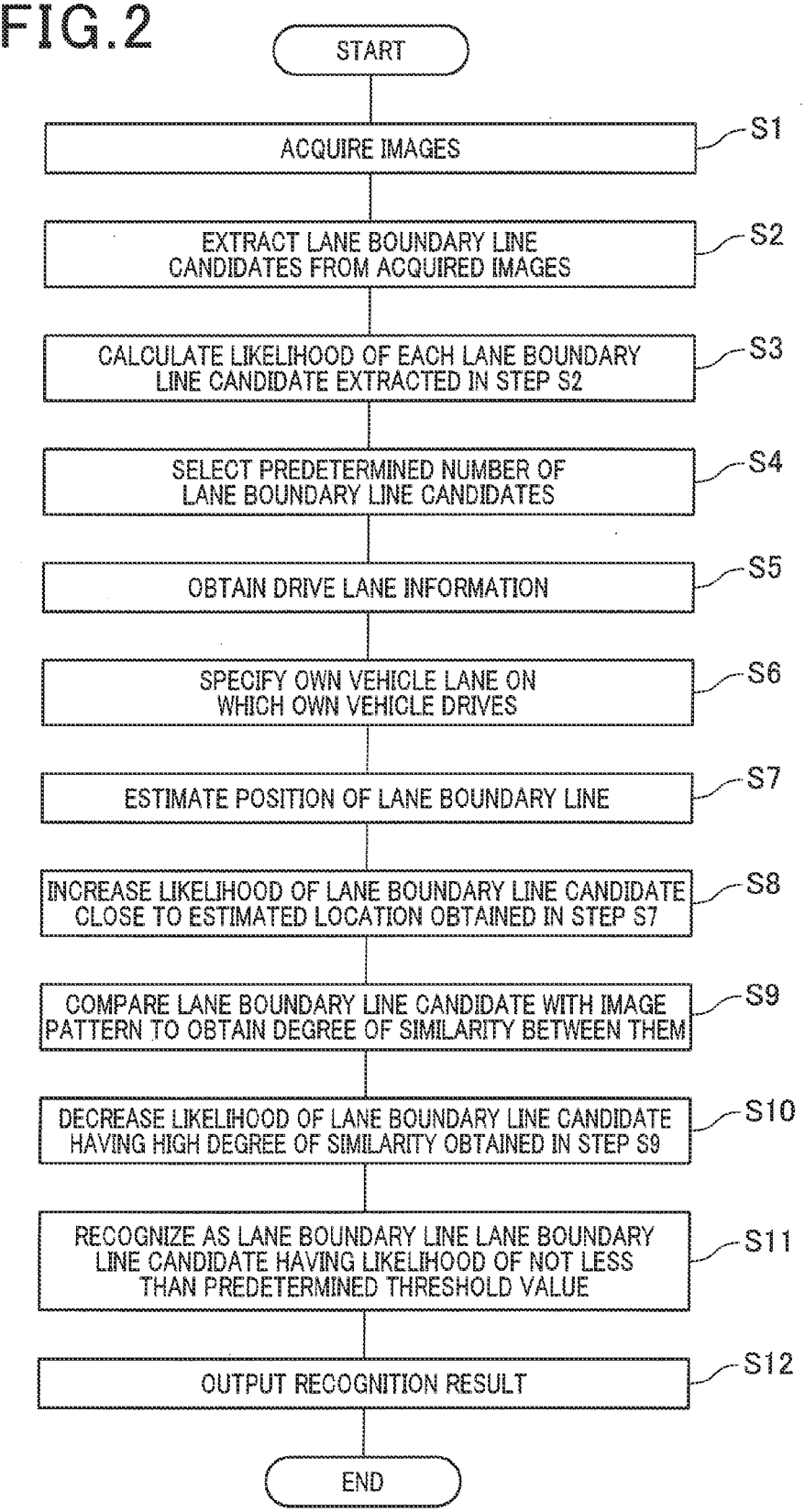
FIG. 2 is a view showing a flow chart of a process performed by the lane boundary line recognition device 1 according to the first exemplary embodiment shown in FIG. 1.

FIG. 2 is a view showing a flow chart of the process performed by the lane boundary line recognition device 1 according to the first exemplary embodiment shown in FIG. 1.

In step S1 shown in FIG. 2, the image acquiring unit 3 in the lane boundary line recognition device 1 instructs the in-vehicle camera 103 to acquire images regarding a front scene in front of the own vehicle 101 and transmits the acquired images to the image acquiring unit 3. The operation flow goes to step S2.

In step S2, the drive lane boundary line candidate extraction unit 5 performs a known method to extract lane boundary line candidates from the image obtained in step S1. Specifically, the drive lane boundary line candidate extraction unit 5 generates horizontal scanning lines in the image obtained in step S1. The drive lane boundary line candidate extraction unit 5 calculates a differential value of a brightness on each of pixels on each of the horizontal scanning lines. The drive lane boundary line candidate extraction unit 5 further calculates an absolute value of the differential value of a brightness on each of the horizontal scanning lines. The drive lane boundary line candidate extraction unit 5 extracts, as edges, the pixels having the absolute value of the differential value which exceeding a predetermined edge threshold value.

The drive lane boundary line candidate extraction unit 5 performs the edge extraction process every horizontal scanning lines in the image. As a result, the drive lane boundary line candidate extraction unit 5 extracts a plurality of edges along the forward direction of the own vehicle 101 from the image. The drive lane boundary line candidate extraction unit 5 performs the fitting process to produce a curved line passing through these extracted edges. The produced curved line is a lane boundary line candidate.

Figure 3:
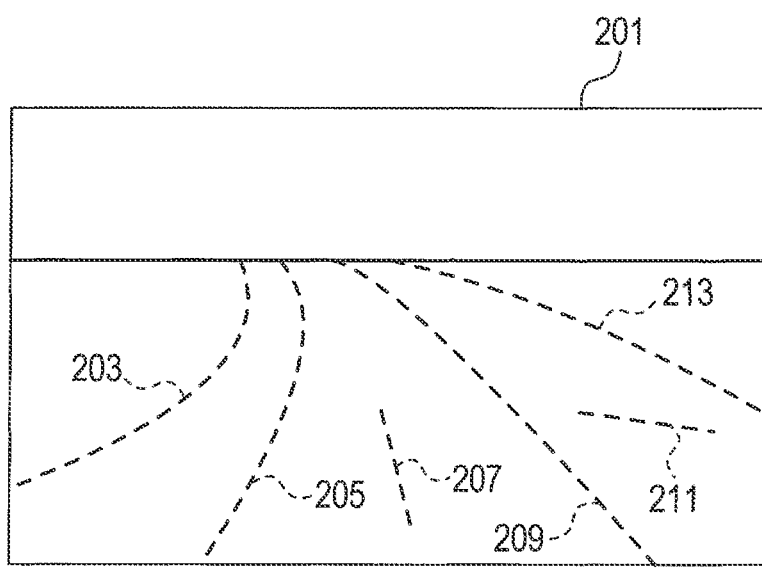
FIG. 3 shows a view showing lane boundary line candidates 203, 205, 207, 209, 211 and 213 designated by dotted lines, extracted from an image 201 by the lane boundary line recognition device 1 according to the first exemplary embodiment shown in FIG. 1.

FIG. 3 shows a view showing lane boundary line candidates 203, 205, 207, 209, 211 and 213 designated by dotted lines. These lane boundary line candidates 203, 205, 207, 209, 211 and 213 are extracted from the image 201 by the lane boundary line recognition device 1 according to the first exemplary embodiment shown in FIG. 1.

For example, as shown in FIG. 3, the drive lane boundary line candidate extraction unit 5 calculates the lane boundary line candidates 203, 205, 207, 209, 211 and 213 designated by dotted lines on the basis of the extracted edges. The operation flow goes to step S3 shown in FIG. 2.

In step S3, the likelihood calculation unit 7 calculates a likelihood of the lane boundary line candidates extracted in step S2. Specifically, when the drive lane boundary line candidate extraction unit 5 extracts a plurality of lane boundary line candidates on the basis of the extracted edges in step S2, the likelihood calculation unit 7 calculates a likelihood of each of the lane boundary line candidates extracted in step S2. The likelihood indicates a degree of the lane boundary line candidate as the actual lane boundary line. That is, the likelihood calculation unit 7 calculates the likelihood of each of the lane boundary line candidates by the following method.

The likelihood calculation unit 7 determines a first likelihood element value on the basis of the absolute value of the differential value of the brightness of each of the edges which have been extracted in step S2. The more the absolute value of the differential value of brightness of the edge increases, the more the first likelihood element value becomes large. That is, when the absolute value of the differential value of brightness of the edge increases, a difference in brightness between the lane boundary line candidate and the surrounding environment becomes large. By the way, a relationship between the absolute value of the differential value of brightness and the fir first likelihood element value is determined in advance.

The likelihood calculation unit 7 further calculates a second likelihood element value on the basis of a length of each of the lane boundary line candidates. The more a length of the lane boundary line candidate is long, the more the second likelihood element value increases. A relationship between a length of the lane boundary line candidate and the second likelihood element value is determined in advance.

Finally, the likelihood calculation unit 7 multiplies the first likelihood element value and the second likelihood element value together to obtain the likelihood of the lane boundary line candidate. The operation flow goes to step S4.

In step S4, the selection unit 11 selects a predetermined number of the lane boundary line candidates obtained in step S2, which have the likelihood of not less than a predetermined threshold value. The selected lane boundary line candidates will also be called to as the "selected candidates". It is acceptable to have one or more selected candidates. The operation flow goes to step S5.

In step S5, the drive lane information acquiring unit 13 reads drive lane information stored in the memory unit 109. The following position data are contained in the drive lane information contain:

The number of drive lanes;
Width of each drive lane;
Shape of each lane boundary line such as solid line, dotted line, etc.;
Type and position of each road structure (roadside barrier, pedestrian barrier, median barrier, road median, road shoulder, street light, traffic sign, signboard, building, etc.)

The drive lane information acquiring unit 13 receives position information transmitted from the GPS 105, specifies the position of the own vehicle 101 on the own vehicle lane on the basis of the received position information, and reads drive lane information, which correspond to the specified position of the own vehicle 101, from the memory unit 109. The operation flow goes to step S6.

In step S6, the drive lane specifying unit 15 compares, i.e. correlates the image obtained in step S1 with the drive lane information fetched in step S5, and specifies the own vehicle lane, on which the own vehicle 101 drives, from one or more drive lanes indicated by the drive lane information on the basis of the correlation results.

Figure 4A:
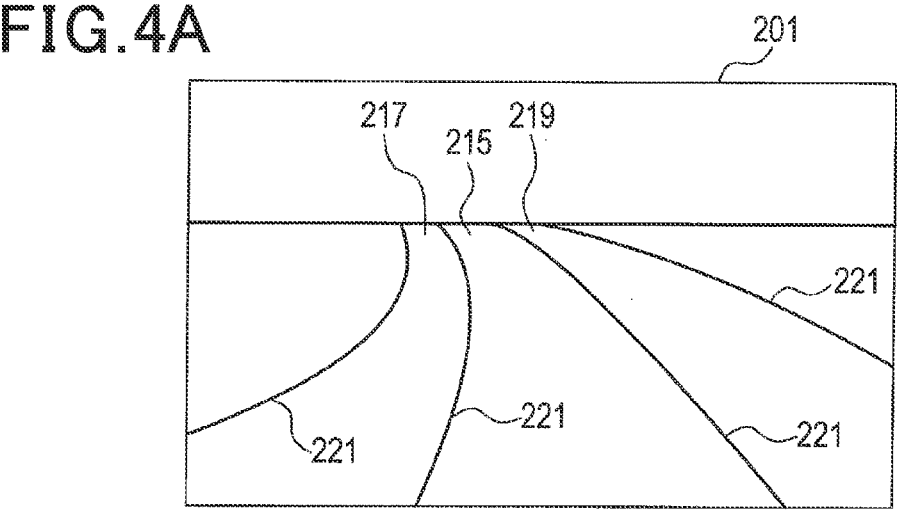
FIG. 4A is a view explaining the image 201 in which a drive lane 215, as an own vehicle lane on which the own vehicle drives, is located at the middle in the image 201.
Figure 4B:
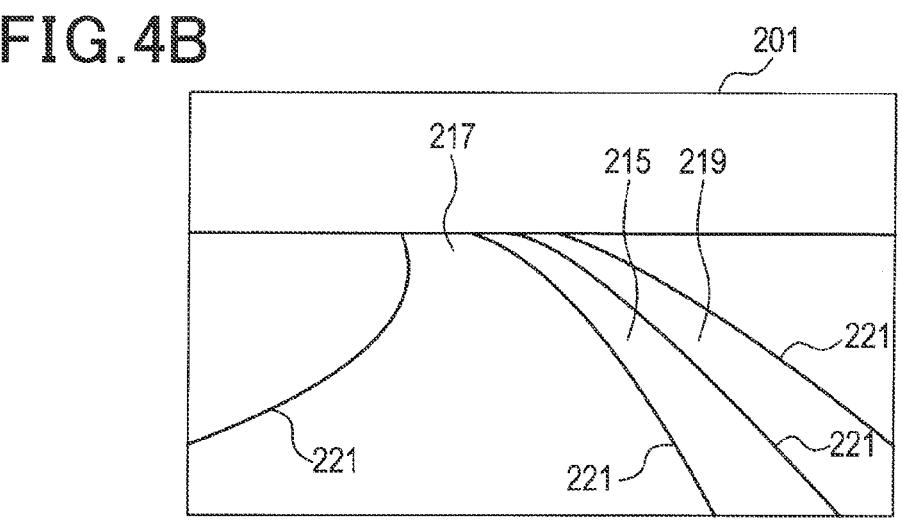
FIG. 4B is a view explaining the image 201 in which a drive lane 217 (own vehicle lane) is located at a left side of the drive lane 215 in the image 201.
Figure 4C:
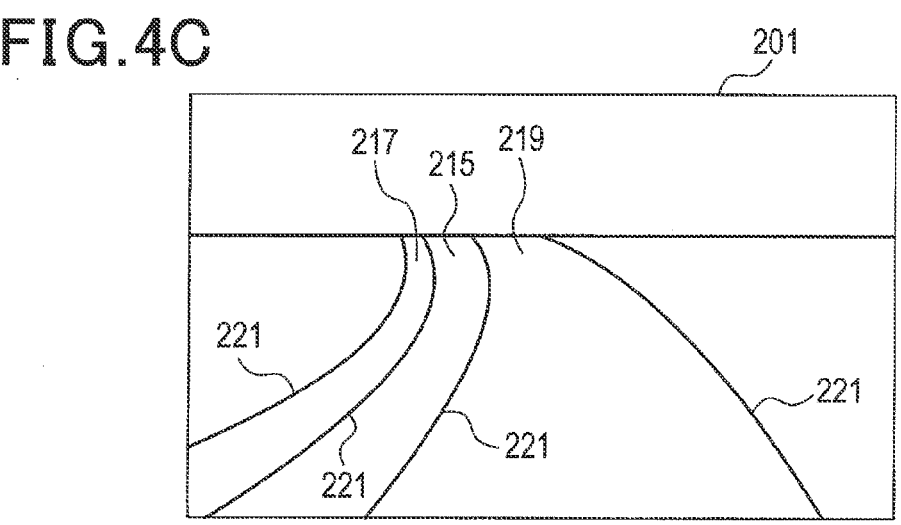
FIG. 4C is a view explaining the image 201 in which a drive lane 219 (own vehicle lane) is located at a right side of the drive lane 215 in the image 201.

FIG. 4A is a view explaining the image 201 in which a drive lane 215 as the own vehicle lane is located at the middle in the image 201. FIG. 4B is a view explaining the image 201 in which a drive lane 217 as the own vehicle lane is located at a left side of the drive lane 215 in the image 201. FIG. 4C is a view explaining the image 201 in which a drive lane 219 as the own vehicle lane is located at a right side of the drive lane 215 in the image 201.

For example, when the image 201 shown in FIG. 4A is obtained in step S2 shown in FIG. 2 and the drive lane information obtained in step S5 by the drive lane information acquiring unit 13 indicates three drive lanes, the image 201 shown in FIG. 4A contains the drive lane 215 located at the middle, the drive lane 217 located at the left side of the drive lane 215, and the drive lane 219 located at the right side of the drive lane 215. It is possible to extract the drive lanes 215, 217 and 219 from the area around the own vehicle 101. That is, the roadway contains the drive lane 215, the drive lane 217 located at the left side of the drive lane 215, and the drive lane 219 located at the right side of the drive lane 215. The roadway is divided into the three drive lanes 215, 217 and 219 by the lane boundary lines 221.

Figure 5A:
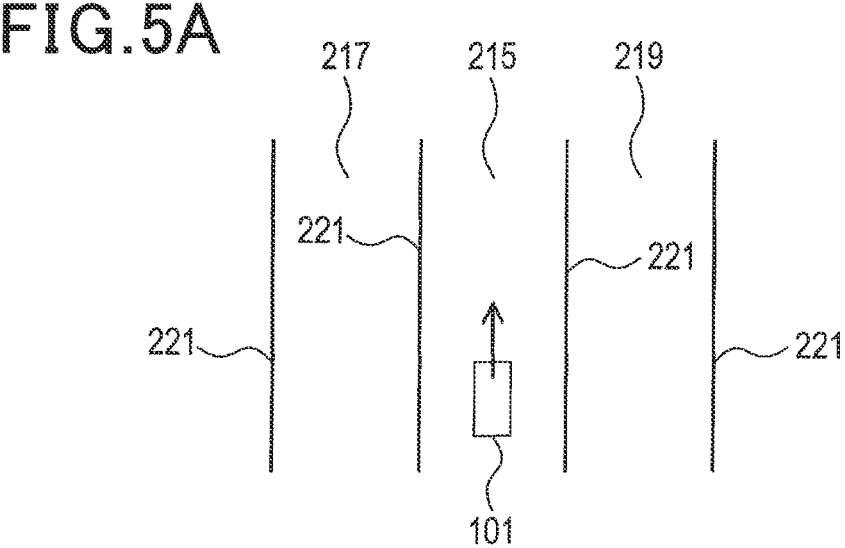
FIG. 5A is a view explaining the drive lane 210 as the own vehicle lane, on which the own vehicle 101 drives, arranged at the middle on a roadway.

For example, when step S1 obtains the image 201 shown in FIG. 4A and the image 201 and the drive lane information are correlated together, it is possible to specify that the own vehicle 101 is driving on the drive lane 215 as the own vehicle lane, not on the drive lane 217 located at the left-side of the drive lane 215 nor the drive lane 219 located at the right-side of the drive lane 215, as shown in FIG. 5A.

Further, for example, when step S1 obtains the image 201 shown in FIG. 4B and the drive lane information shows the three drive lanes, the image 201 shown in FIG. 4B contains the drive lane 217 as the own vehicle lane on which the own vehicle 101 drives, and the drive lanes 215 and 219 located at the right side of the drive lane 217.

Figure 5B:
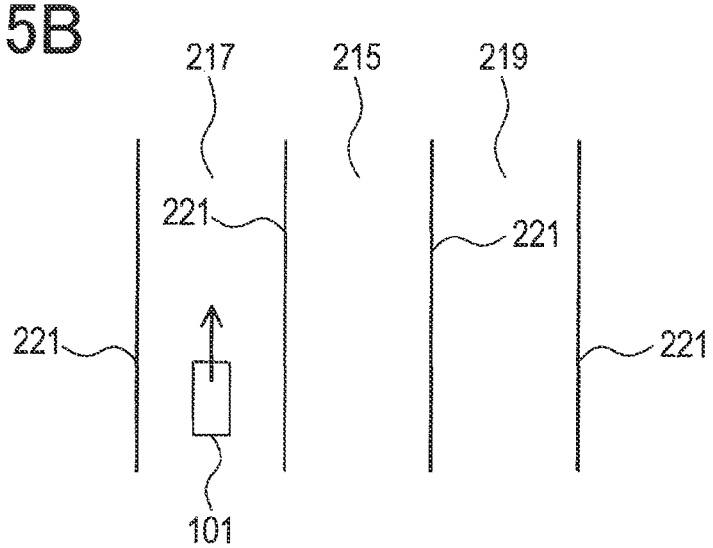
FIG. 5B is a view explaining the drive lane 217 as the own vehicle lane, on which the own vehicle 101 drives, at the left side on the roadway.

When the image 201 shown in FIG. 4B and the drive lane information are correlated together, it is possible to specify that the own vehicle 101 drives on the drive lane 217 as the own vehicle lane, not on the drive lane 215 and the drive lane 219 located at the right side of the drive lane 217 as shown in FIG. 5B.

Still further, for example, when step S1 obtains the image 201 shown in FIG. 4C and the drive lane information shows the three drive lanes, the image 201 shown in FIG. 4C contains the drive lane 219 on which the own vehicle 101 drives, and the drive lanes 215 and 217 located at the left side of the drive lane 219.

Figure 5C:
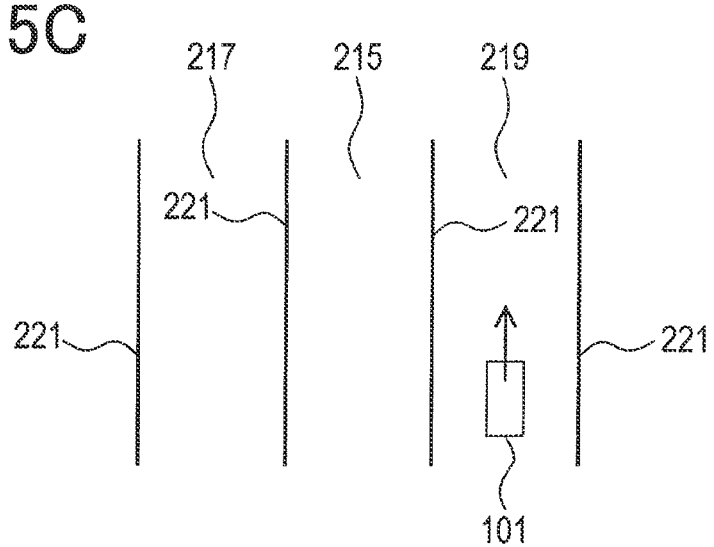
FIG. 5C is a view explaining the drive lane 219, on which the own vehicle 101 drives, at the right side on the roadway.

When the image 201 shown in FIG. 4C and the drive lane information are correlated together, it is possible to specify that the own vehicle 101 drives on the drive lane 219 as the own vehicle lane, not on the drive lane 215 and the drive lane 217 located at the left side of the drive lane 219 as shown in FIG. 5C.

Even if the drive lane information indicates that the number of drive lanes is not less than three, it is possible to specify the own vehicle lane on which the own vehicle 101 drives by the same method previously described. The operation flow goes to step S7 shown in FIG. 2.

In step S7, the drive lane boundary line position estimation unit 17 estimates the position of the lane boundary lines on the basis of the drive lane information obtained in step S5. A description will now be given of the method of estimating the position of each of the lane boundary lines on the roadway.

The pre-conditions to estimate a position of the lane boundary line are as follows:
(1) There are drive lanes on the roadway, the number of which is indicated by the drive lane information;
(2) The own vehicle 101 drives on the drive lane specified in step S6 which is one of the drive lanes on the roadway indicated by the drive lane information;
(3) The lane boundary line candidate selected in step S4 is overlapped with one or more lane boundary lines;
(4) A width of each of the drive lanes is specified by the lane boundary information; and
(5) Shape of each lane boundary line such as solid line, dotted line, etc. is specified by the lane boundary information.

The lane boundary line recognition device 1 according to the first exemplary embodiment estimates the position of each of the lane boundary lines so that all of the pre-conditions (1) to (5) are satisfied.

Figure 6A:
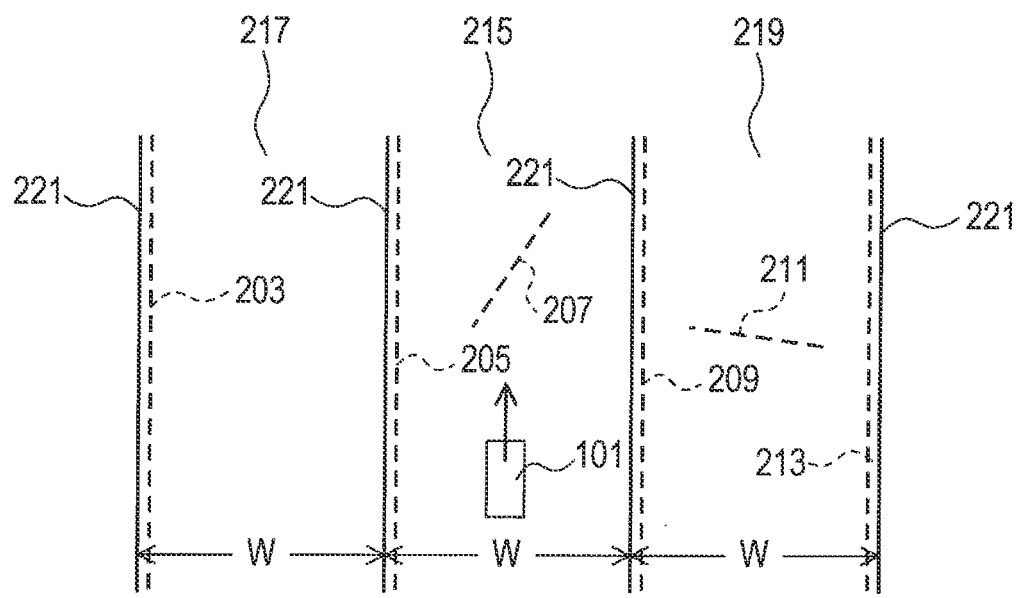
FIG. 6A is a view showing an estimated position of each of the lane boundary lines.
Figure 6B:
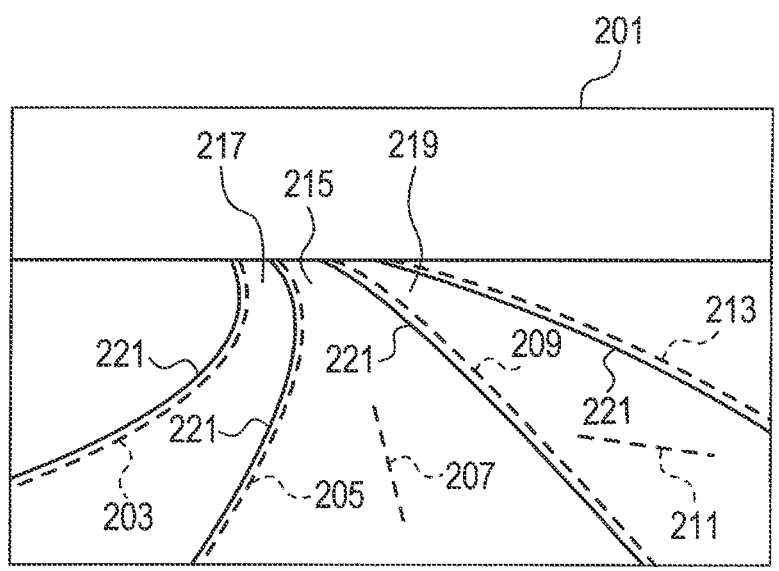
FIG. 6B is a view showing an estimated position of each of the lane boundary lines in the image 201.

FIG. 6A is a view showing an estimated position of each of the lane boundary lines. FIG. 6B is a view showing an estimated position of each of the lane boundary lines in the image 201. That is, FIG. 6A shows the case having the three drive lanes 215, 217 and 219. Because the own vehicle 101 drives on the drive lane 215 as the own vehicle lane located at the middle on the roadway, the two lane boundary lines 221 are arranged at the left side of the own vehicle 101 on the drive lane 205. Similarly, as shown in FIG. 6A, the two lane boundary lines 221 are also arranged at the right side of the own vehicle 101. Because each of the drive lanes 215, 217 and 219 has a road width W, there is a constant relationship in position between the four lane boundary lines 221. The most-close lane boundary line 221 in the four lane boundary lines 221, which is most close to the selected candidate (as the lane boundary line candidate 209), is adjusted to overlap with the selected candidate. That is, the position of each of the four lane boundary lines 221 is adjusted so that the second lane boundary line 221 in the four lane boundary lines 221 counted from the outermost right side is overlapped with the selected candidate.

As a result, the position of each of the four lane boundary lines 221 is determined to satisfy the pre-conditions (1) to (5). FIG. 6B shows the estimated lane boundary lines 221 in the image 201 on the basis of the drive lane information shown in FIG. 6A.

It is possible to specify the position of each of the lane boundary lines in another image, similar to the case shown in FIG. 6A, which fulfills the pre-conditions (1) to (5) previously described. The operation flow goes to step S8.

In step S8 shown in FIG. 2, the likelihood calculation unit 7 performs the following process.

In step S8, the likelihood calculation unit 7 judges whether or not a difference in position between each of the lane boundary line candidates obtained in step S2 and the lane boundary line estimated in step S7 is within a predetermined range.

When the judgment result in step S8 indicates affirmation ("YES" in step S8), the likelihood calculation unit 7 increases the likelihood of the lane boundary line candidate calculated in step S3 by a predetermined value. On the other hand, when the judgment result in step S8 indicates negation ("NO" in step S8), the likelihood calculation unit 7 does not increase the likelihood of the lane boundary line candidate.

For example, in the cases shown in FIG. 6A and FIG. 6B, because the position of each of the lane boundary line candidates 203, 205, 209 and 213 is close to the position of the corresponding estimated lane boundary line 221, the likelihood of each of the lane boundary line candidates 203, 205, 209, 213 is increased. On the other hand, because the position of each of the lane boundary line candidates 207 and 211 is far from the position of the estimated lane boundary line 221, the likelihood of each of the lane boundary line candidates 207 and 211 is not changed. The operation flow goes to step S9.

In step S9 shown in FIG. 2, the similarity judgment unit 19 compares the lane boundary line candidate obtained in step S2 with an image pattern in order to determine a degree of similarity between them. This image pattern represents outlines of objects and road structures, other than the lane boundary lines, in the area containing the roadway and its surrounding area. For example, the objects are traffic signs such as speed limit signs and pedestrian crossings painted on the surface of the roadway. The road structures are a roadside barrier, pedestrian barrier, a road median, a road shoulder, a street light, a traffic sign, a signboard, a building, etc. The image pattern is stored in advance in the memory unit 109.

The degree of similarity represents a similarity between two objects. The more the degree of similarity increases, the more the outlines of the objects are similar to each other. It is possible to calculate the degree of similarity by using a known image recognition method. The operation flow goes to step S10.

In step S10, when the degree of similarity calculated in step S9 is not less than a predetermined threshold value, i.e. when there is a high possibility that the lane boundary line candidate is similar to the image pattern of an object, the similarity judgment unit 19 reduces the likelihood of the lane boundary line candidate calculated in step S3 by a predetermined value. On the other hand, when the degree of similarity calculated in step S9 is less than the predetermined threshold value, the similarity judgment unit 19 does not reduce the likelihood of the lane boundary line candidate. The operation flow goes to step S11.

In step S11, the similarity judgment unit 19 recognizes, as the lane boundary lines on the roadway, the lane boundary line candidates having the likelihood of not less than the predetermined threshold value. The likelihood of each of the lane boundary line candidates have been calculated or adjusted in step S3, S8 and S10. The operation flow goes to step S12.

In step S12, the lane boundary line recognition device 1 outputs the information of the lane boundary lines, for example, the position, the curvature, etc. of each of the lane boundary lines, recognized in step S10 to the warning-vehicle control unit 111.

3. Effects of the Lane Boundary Line Recognition Device 1

A description will now be given of the effects (1A), (1B) and (1C) of the lane boundary line recognition device 1 according to the first exemplary embodiment having the structure and operations previously described.

(1A) The lane boundary line recognition device 1 is capable of increasing the likelihood of the lane boundary line candidate having a high probability of a lane boundary line on the basis of the drive lane information. This makes it possible to increase the recognition degree to correctly recognize lane boundary lines on adjacent drive lanes on a roadway, in particular, correctly recognize lane boundary lines which are far from the own vehicle lane on which the own vehicle 101 drives. On the other hand, a conventional device is difficult to correctly recognize lane boundary lines on other drive lane far from the own vehicle lane.

(1B) The lane boundary line recognition device 1 is capable of recognizing the lane boundary lines on drive lanes which are adjacent to the own vehicle lane with high accuracy. It is further possible for the lane boundary line recognition device 1 to easily recognize other vehicles and road obstacles on the drive lanes adjacent to the own vehicle lane on the basis of the recognition results of the lane boundary lines on the drive lanes adjacent to the own vehicle lane. As a result, it is possible for the own vehicle to change the own vehicle lane to the adjacent drive lane safely.

(1C) The lane boundary line recognition device 1 reduces the likelihood of the lane boundary line candidate having a high degree of similarity with the image patterns representing road objects other hand lane boundary line. This control makes it possible to suppress occurrence of an error recognition of recognizing as a lane boundary line an object which is not a lane boundary line.

Second Exemplary Embodiment

Figure 7A:
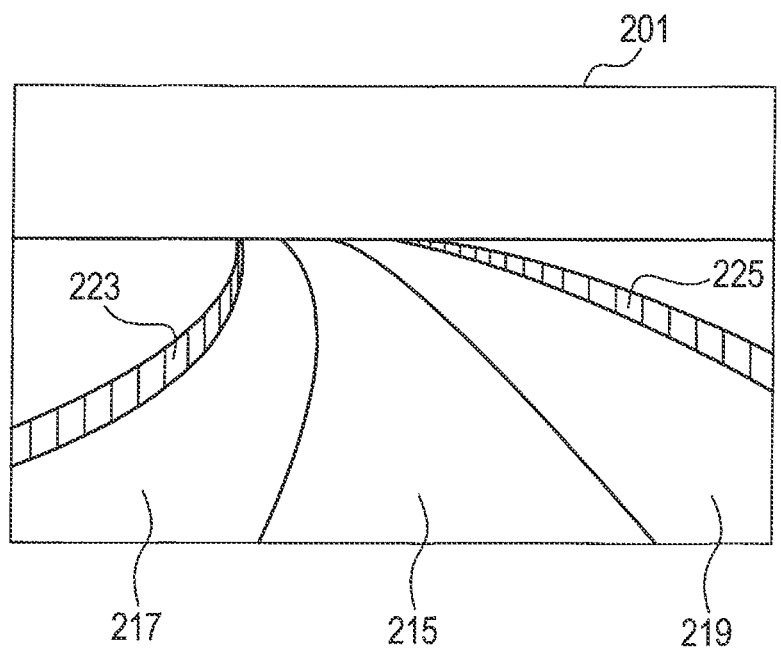
FIG. 7A is a view explaining the image 201 which contains roadside barriers 223, 225 as road structures on the roadway.
Figure 7B:
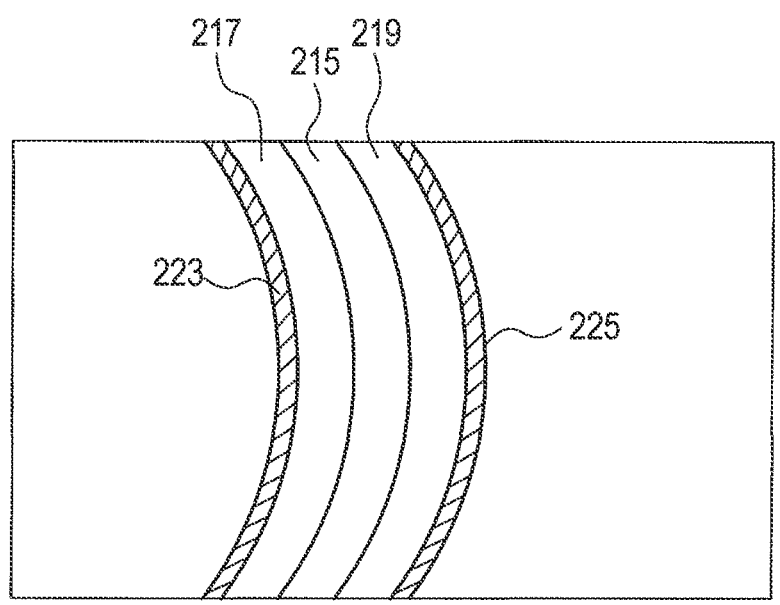
FIG. 7B is a view showing drive lane information containing the roadside barriers 223, 225 to be used by the lane boundary line recognition device 1 according to the second exemplary embodiment.

A description will be give of the lane boundary line recognition device 1 according to a second exemplary embodiment with reference to FIG. 7A and FIG. 7B.

FIG. 7A is a view explaining the image 201 which contains roadside barriers 223, 225 as road structures on the roadway. FIG. 7B is a view showing drive lane information containing the roadside barriers 223, 225 to be used by the lane boundary line recognition device 1 according to the second exemplary embodiment.

The same components of the lane boundary line recognition device 1 between the second exemplary embodiment and the first exemplary embodiment will be referred to with the same reference numbers and characters. The explanation of the same components is omitted for brevity. The difference of the lane boundary line recognition device 1 between the second exemplary embodiment and the first exemplary embodiment will be explained.

The lane boundary line recognition device 1 according to the second exemplary embodiment performs the process of specifying the own vehicle lane by the following process (which corresponds to step S6 shown in FIG. 2).

The drive lane specifying unit 15 recognizes one or more objects in the image 201 obtained in step S1. It is possible to use a known image recognition technique to recognize the object. In general, there are road structures such as roadside barrier, pedestrian barrier, median barrier, road median, road shoulder, street light, traffic sign, signboard, building, etc.)

The drive lane specifying unit 15 obtains a position of the object in views from the own vehicle 101 on the basis of the position of the object in the image. For example, in the case shown in FIG. 7A, because the road objects (roadside barrier, pedestrian barrier) 223, 225 are located in bilateral symmetry at the right side and the left side of the median lane 215 are recognized, the road objects 223 and 225 are located in bilateral symmetry of the own vehicle 101.

The drive lane specifying unit 15 reads position information of the road objects contained in the drive lane information. For example, in the case shown in FIG. 7A, the drive lane information contains the position information regarding the road objects as shown in FIG. 7B. The position information of the road objects indicates that the road objects 223 and 225 are located in bilateral symmetry at the right side and the left side of the median lane 215.

The drive lane specifying unit 15 correlates the position of the objects viewed from the own vehicle 101 with the position information of the road objects contained in the drive lane information, and specifies the own vehicle lane on which the own vehicle 101 drives on the basis of the correlation result.

For example, in the case shown in FIG. 7A and FIG. 7B, it is possible to recognize the road objects 223 and 225, which are located approximately in bilateral symmetry viewed from the own vehicle 101, from the image 210. In addition, it is also possible to recognize the road objects 223 and 225, which are located approximately in bilateral symmetry viewed from the median lane 215, from the drive lane information. Accordingly, when the recognition results obtained from FIG. 7A and FIG. 7B are compared together, it is possible for the lane boundary line recognition device 1 according to the second exemplary embodiment to specify that the own vehicle lane on which the own vehicle 101 drives is the drive lane 215 as the median lane.

It is possible for the lane boundary line recognition device 1 to correctly recognize the own vehicle lane on which the own vehicle 101 drives even if the image 201 obtained in step S1 contains road objects having a different position and the different number of the road objects.

(Effects of the Lane Boundary Line Recognition Device 1 of the Second Exemplary Embodiment)

The lane boundary line recognition device 1 according to the second exemplary embodiment has the following effect (2A) in addition to the effects (1A) to (1C) previously described.

(2A) The lane boundary line recognition device 1 specifies the own vehicle lane on which the own vehicle 101 drives on the basis of the recognition results of the road objects contained in the image obtained in step S1. This makes it possible to further increase the detection accuracy of detecting the own vehicle lane on which the own vehicle 101 drives.

Third Exemplary Embodiment

Figure 8A:
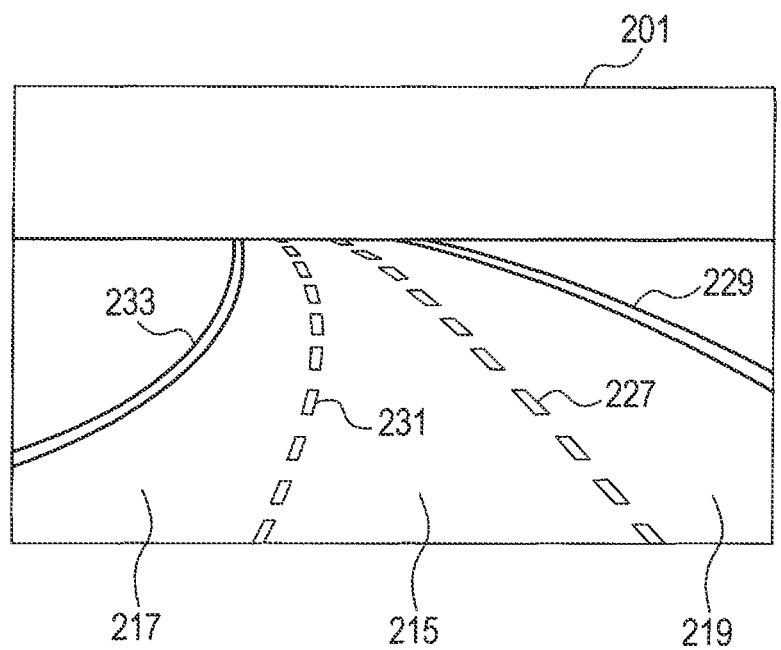
FIG. 8A is a view showing the image 201 which contains lane boundary lines designated by dotted lines 227 and 231, and the drive lanes 215, 217 and 219.
Figure 8B:
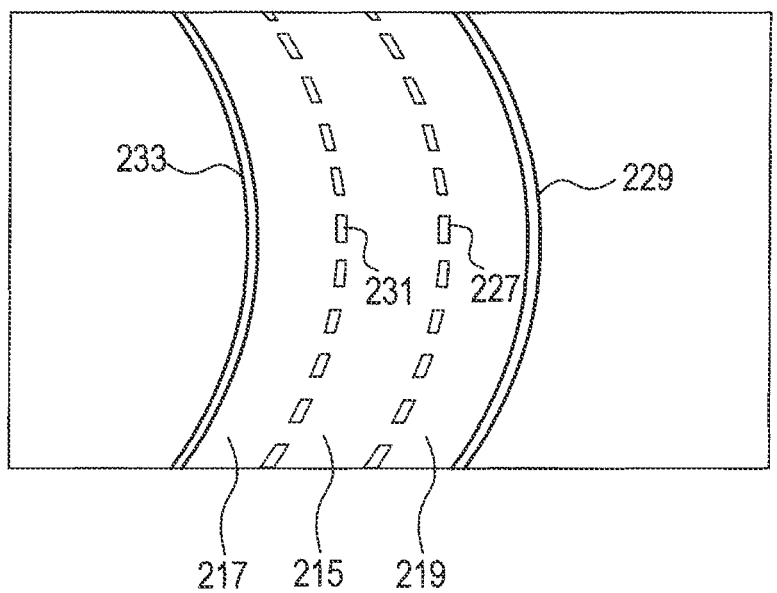
FIG. 8B is a view showing drive lane information containing the lane boundary lines 227, 231 to be used by the lane boundary line recognition device 1 according to the third exemplary embodiment.

A description will be give of the lane boundary line recognition device 1 according to a third exemplary embodiment with reference to FIG. 8A and FIG. 8B.

1. Structure and Process of the Lane Boundary Line Recognition Device 1

FIG. 8A is a view showing the image 201 which contains lane boundary lines designated by dotted lines 227 and 231, and the drive lanes 215, 217 and 219 on a roadway. FIG. 8B is a view showing drive lane information containing the lane boundary lines 227, 231 to be used by the lane boundary line recognition device 1 according to the third exemplary embodiment.

The same components of the lane boundary line recognition device 1 between the third exemplary embodiment and the first exemplary embodiment will be referred to with the same reference numbers and characters. The explanation of the same components is omitted for brevity. The difference of the lane boundary line recognition device 1 between the third exemplary embodiment and the first exemplary embodiment will be explained.

The lane boundary line recognition device 1 according to the third exemplary embodiment performs the process of specifying the own vehicle lane by the following process (which corresponds to step S6 shown in FIG. 2).

The drive lane specifying unit 15 in the lane boundary line recognition device 1 recognizes a shape of a lane boundary line in the image 201 obtained in step S1. For example, the lane boundary line has a shape designated by a dotted line or a solid line. It is possible to recognize the shape of each lane boundary line by using a known image recognition technique.

Next, the drive lane specifying unit 15 specifies an arrangement of each of the lane boundary lines whether each of the lane boundary lines is arranged at a right side or a left side of the own vehicle 101, and what shape each of the lane boundary lines has. That is, the drive lane specifying unit 15 specifies an arrangement pattern of each of the lane boundary lines. For example, in the case shown in FIG. 8A, the lane boundary line 227 is designated by the dotted line and arranged at the right side of the own vehicle 101 on the own vehicle lane 215, and the lane boundary line 229 is designated by the solid line and arranged at the right side over the lane boundary line 227. Similarly, as shown in FIG. 8A, the lane boundary line 231 is designated by the dotted line, and arranged at the left side of the own vehicle 101 on the own vehicle lane 215, and the lane boundary line 233 is designated by the solid line and arranged at the left side over the lane boundary line 231.

Next, the drive lane specifying unit 15 reads shape information of the lane boundary lines from the drive lane information. For example, in the case shown in FIG. 8A, when the drive lane information contains shape information regarding the lane boundary lines shown in FIG. 8B, the lane boundary line 217 designated by the dotted line is located at a right side of the own vehicle lane 215 on which the own vehicle 101 drives, and the lane boundary line 229 designated by the solid line is located at the right side over the lane boundary line 227. Similarly, as shown in FIG. 8B, when the lane boundary line 231 designated by the dotted line is located at a left side of the own vehicle 101 on the own vehicle lane 215, and the lane boundary line 233 designated by the solid line is located at the left side over the lane boundary line 231.

Next, the drive lane specifying unit 15 correlates the arrangement pattern of the lane boundary lines obtained from the image 201 with the shape information of the lane boundary line contained in the drive lane information, and specifies the own vehicle lane on which the own vehicle 101 drives on the basis of the correlation result.

For example, in the case shown in FIG. 8A and FIG. 8B, it is possible to specify the drive lane 215 as the own vehicle lane on which the own vehicle 101 drives on the basis of the correlation result.

It is possible for the lane boundary line recognition device 1 to correctly recognize the own vehicle lane on which the own vehicle 101 drives even if the image 201 obtained in step S1 contains a different arrangement pattern of the lane boundary lines.

(Effects of the Lane Boundary Line Recognition Device 1 of the Third Exemplary Embodiment)

The lane boundary line recognition device 1 according to the third exemplary embodiment has the following effect (3A) in addition to the effects (1A) to (1C) previously described.

(3A) The lane boundary line recognition device 1 specifies the own vehicle lane on which the own vehicle 101 drives on the basis of the recognition results regarding the shape of the lane boundary line in the image obtained in step S1. This makes it possible to further increase the detection accuracy of detecting the own vehicle lane on which the own vehicle 101 drives with high accuracy.

Other Modifications

The lane boundary line recognition device 1 has the following modifications (M1) to (M5).

(M1) In the structure of the lane boundary line recognition device 1 according to the second exemplary embodiment previously described, it is possible to use a millimeter-wave sensor in order to detect a position of a road object (i.e. a distance between the own vehicle and the road object, and an azimuth of the road object measured from the own vehicle.

(M2) In the structure of the lane boundary line recognition device 1 according to each of the first to third exemplary embodiments previously described, it is possible to receive the drive lane information transmitted from external devices such as other vehicles and devices arranged on roads through the communication unit 107.

(M3) In the structure of the lane boundary line recognition device 1 according to each of the first to third exemplary embodiments previously described, it is possible for the lane boundary line recognition device 1 to be equipped with the memory unit 109. Further, it is possible for the memory unit 109 to temporarily store information transmitted from road devices and other vehicles.

(M4) It is possible for the lane boundary line recognition device 1 to have a plurality of components which perform each function of the lane boundary line recognition device 1. It is also possible for the lane boundary line recognition device 1 to use a known device to perform all or some of the functions of the lane boundary line recognition device 1. It is possible to combine some of the functions provided by the lane boundary line recognition device 1 according to the first to third exemplary embodiments.

(M5) In addition to provide the lane boundary line recognition device 1, it is also possible to provide a system having the lane boundary line recognition device 1, one or more computer-readable programs, to be executed by a computer system, capable of performing the function of the lane boundary line recognition device 1 according to the first to third exemplary embodiments. It is also possible to provide a medium storing these programs, and a method of performing the function of the lane boundary line recognition device 1 according to the first to third exemplary embodiments.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A lane boundary line recognition device comprising:
   an image acquiring unit capable of acquiring surrounding images of a roadway on which an own vehicle drives;
   a drive lane boundary line candidate extraction unit capable of extracting lane boundary line candidates from the surrounding images acquired by the image acquiring unit;
   a likelihood calculation unit capable of calculating a likelihood of each of the lane boundary line candidates;
   a drive lane boundary line recognition unit capable of recognizing, as a lane boundary line, a lane boundary line candidate having the likelihood of not less than a predetermined threshold value;
   a selection unit capable of selecting a predetermined number of the lane boundary line candidates having the likelihood of not less than the predetermined threshold value;
   a drive lane information acquiring unit capable of obtaining drive lane information containing a number of drive lanes on the roadway on which the own vehicle drives, and a width of each of the drive lanes;
   a drive lane specifying unit capable of correlating the surrounding images acquired by the image acquiring unit with the drive lane information, and specifying an own vehicle lane on which the own vehicle drives in the drive lanes indicated by the drive lane information; and
   a drive lane boundary line position estimation unit capable of estimating a position of each of the lane boundary lines on the basis of the drive lane information when two conditions (a) and (b) are satisfied:
   (a) when the own vehicle drives on the drive lane specified as the own vehicle lane by the drive lane specifying unit, and
   (b) when the lane boundary line candidates selected by the selection unit correspond to lane boundary lines of the drive lane specified by (a),
   wherein the likelihood calculation unit increases the likelihood of the lane boundary line candidate when a distance between the position of the lane boundary line candidate obtained from the surrounding images acquired by the image acquiring unit and the estimated position of the lane boundary line candidate obtained by the drive lane boundary line position estimation unit is within a predetermined range.

2. The lane boundary line recognition device according to claim 1, wherein the drive lane information contains position information of road objects on and around the roadway, and
   the drive lane specifying unit obtains a position of each of the road objects viewed from the own vehicle, and specifies the own vehicle lane on the roadway on which the own vehicle drives on the basis of the position of each of the road objects and the position information of the road objects.

3. The lane boundary line recognition device according to claim 2, wherein the road objects are not less than one selected from roadside barrier, pedestrian barrier, road median, road shoulder, traffic sign, signboard, street light and building.

4. The lane boundary line recognition device according to claim 1, further comprising:
   a memory unit capable of storing image patterns of road objects excepting the lane boundary lines; and
   a similarity judgment unit capable of judging a degree of similarity between each of the lane boundary line candidates and each of the image patterns, wherein
   the similarity judgment unit decreases the likelihood of the lane boundary line candidate according to increasing of the calculated degree of similarity.

5. The lane boundary line recognition device according to claim 2, further comprising:
   a memory unit capable of storing image patterns of road objects excepting the lane boundary lines; and
   a similarity judgment unit capable of judging a degree of similarity between each of the lane boundary line candidates and each of the image patterns, wherein
   the similarity judgment unit decreases the likelihood of the lane boundary line candidate according to increasing of the calculated degree of similarity.

6. The lane boundary line recognition device according to claim 3, further comprising:
   a memory unit capable of storing image patterns of road objects excepting the lane boundary lines; and
   a similarity judgment unit capable of judging a degree of similarity between each of the lane boundary line candidates and each of the image patterns, wherein the similarity judgment unit decreases the likelihood of the lane boundary line candidate according to increasing of the calculated degree of similarity.

7. The lane boundary line recognition device according to claim 2, wherein the drive lane information further contains position information of the road objects, and
   the drive lane specifying unit is capable of correlating the position of the road objects viewed from the position of the own vehicle with the position information of the road objects contained in the drive lane information, and specifying the own vehicle lane on which the own vehicle drives on the basis of the correlation result.

8. The lane boundary line recognition device according to claim 1, wherein the drive lane information further contains shape information of the lane boundary lines, and
   the drive lane specifying unit is capable of correlating an arrangement pattern of the lane boundary lines obtained from the surrounding images acquired by the image acquiring unit with the shape information of the lane boundary lines contained in the drive lane information, and specifying the own vehicle lane on which the own vehicle drives on the basis of the correlating result.

* * * * *